(12) United States Patent
Tsai et al.

(10) Patent No.: US 6,382,264 B1
(45) Date of Patent: May 7, 2002

(54) RECYCLABLE FUEL DISTRIBUTION, STORAGE, DELIVERY AND SUPPLY SYSTEM

(75) Inventors: Tsepin Tsai, Chappaqua; Sadeg M. Faris, Pleasantville, both of NY (US)

(73) Assignee: Reveo, Inc., Elmsfrod, NY (US)

( * ) Notice: Subject to any disclaimer, the term of this patent is extended or adjusted under 35 U.S.C. 154(b) by 0 days.

(21) Appl. No.: 09/598,527

(22) Filed: Jun. 21, 2000

(51) Int. Cl.⁷ .............................. B65B 1/04; B65B 3/04
(52) U.S. Cl. .................. 141/1; 141/2; 141/18; 141/231
(58) Field of Search .................. 141/2, 4–7, 18, 141/94, 231, 232, 1; 429/27, 49

(56) References Cited

U.S. PATENT DOCUMENTS 5,405,713 A * 4/1995 Pecherer et al. ............... 429/49
5,952,117 A * 9/1999 Colborn et al. ............... 429/27

\* cited by examiner

Primary Examiner—Timothy L. Maust
(74) Attorney, Agent, or Firm—Israel Nissenbaum; Ralph J. Crispino; Gerow D. Brill

(57) ABSTRACT

A recyclable fuel distribution system comprising a hierarchy of operatively linked (with fuel supply and reaction product collection elements) fluid fuel transport vehicles, fluid fuel storage tanks, fuel supply reservoirs (optional depending on specific use), and fluid fuel usage devices operatively linked to the storage tanks or supply reservoirs, as applicable. The fuel, during use, undergoes a reversible chemical reaction, whereby collected reaction product is reversible to the original fuel. At least one and preferably all of the vehicles, storage tanks and reservoirs contain a storage volume with separated chambers, adapted to inversely change relative to fuel being supplied and reaction product being collected and stored. As a result, a single volume during transport, storage, and use, provides the dual function of fuel supply and collection of reversible reaction product, with concomitant nearly halving of transport, storage and use volumes and costs. Electrical production with a zinc fuel which reversibly forms a zinc oxide reaction product is a particularly suitable fuel for the present system for use in large scale fuel cell applications. Applications range from large scale megawatt power levels for industrial levels to tens of kilowatts for homes and transportation systems down to several watts for portable electrical and electronic appliances and devices.

18 Claims, 1 Drawing Sheet

RECYCLABLE FUEL DISTRIBUTION, STORAGE, DELIVERY AND SUPPLY SYSTEM

FIELD OF THE INVENTION

Figure 1A:
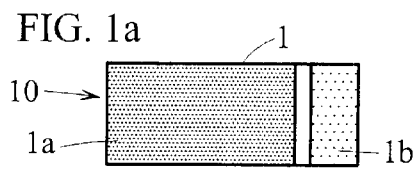

This invention relates to fuel supply systems such as used for the production of heat and electricity (e.g., fuel cell DC-current generation) and particularly to large scale systems utilizing vehicle supply and storage tanks and/or supply reservoirs as well as small scale consumer use, storage, utilization, delivery and supply.

BACKGROUND OF THE INVENTION

Currently, combustion fuel (defined as materials used to provide energy via combustion) for relatively large scale continuous use is provided to various utilization sites by transport vehicles, including trucks (e.g., oil and gasoline trucks), trains and even ocean-going ships (e.g.,tankers). The combustion fuel such as oil, gasoline and even coal is combusted at the utilization sites to provide heat or to run generators of electricity and combustion reaction products (primarily carbon oxides, water and pollutants such $NO_x$ and $SO_2$ are formed and vented to the air with intervening scrubbing devices). These fuels are non-renewable and there is a constant effort to find new sources for such fuels. In addition, suppliers exercise monopoly and often extortionist power in controlling the supply of fuel.

Supply of combustion fuel or a direct supply of electricity may also be continuous, constant and always at hand with direct supply lines between source supplier and consumer, e.g., natural gas and electricity. Such constant supply (not periodic as with transport vehicle delivery) requires a built in infra-structure (e.g., pipes, cables, wires, etc.) which, while normally available in developed urban areas, is often not available in rural and even many suburban areas. In the absence of such supply line infrastructures, combustion fuels are most often delivered to storage tanks or storage containers or sites at pre-arranged schedules or as ordered, directly by fuel supply vehicles, e.g., fuel supply trucks.

Hydrogen based fuel for on site fuel cells requiring transport to the site have several limitations including over-riding safety consideration and costly handling infrastructure. Use of fluid hydrocarbon fuel, natural gas and methane requires devices such as reformers to produce hydrogen, carbon dioxide and other byproducts. Utilization is complicated, costly, and polluting. Furthermore, these fuels are inconvenient to deliver, store or use, particularly in small portable electronics as a result of their inability to be effectively scaled down for general consumer use.

Electricity by direct generation using local small gasoline or kerosene fueled generators still entails storage and delivery of gasoline and kerosene, which can be dangerous and the use of such fuels is via a full combustion and is not normally recyclable.

SUMMARY OF THE INVENTION

It is an object of the present invention to provide a system and method for the supply of fuel, particularly of a fluid metal type for the production of electricity, and the efficient collection of reaction product for regeneration of said fuel in a substantially fully recyclable fuel supply system.

It is a further object of the present invention to provide elements of the system during fuel transport, distribution site storage, utilization site storage and as a utilization reservoir within devices, powered thereby, wherein there are no constraints on reservoir size and configuration and the reservoir can be remote from a utilization site with either manual transport of fuel to the utilization site or by transport through ducts or other conduits.

It is yet another object of the present invention to efficiently distribute and supply a metal fluid or paste fuel to reduce release of polluting materials to the air and to provide a renewable source of fuel which is safe and readily handleable and which can be effectively ultimately used by tapping a local reservoir to provide sufficient material to periodically replenish fuel cell configurations in electrical appliances even with applications of less than one watt or with very low relative wattage, such as in portable electronics products including electric bikes, scooters, wheelchairs, toys, portable computers and even electric cars, and for applications up to and including large generators with applicable use of over 100,000 watts.

It is still yet another object of the present invention to provide an efficient distribution system for fuel supply and waste collection for any of immediate use, local storage, distribution and use, and bulk distribution, storage and use.

It is another object of the invention to provide an efficient method for communication, ordering and delivery of fuel supplies of said metal fluid or paste fuel.

Generally the present invention comprises a recyclable fuel distribution system or infrastructure comprising a hierarchy of operatively linked (with fuel supply and reaction product collection elements) fluid fuel transport means, fluid fuel storage means (at large commercial distribution sites or at the smaller consumer utilization level), fuel supply reservoir means (optional depending on specific use), and fluid fuel usage devices operatively linked to the storage tanks or supply reservoirs, as applicable. In addition, actual devices utilizing the fluid fuel comprise part of the system.

With metal fluids or pastes which provide fuel for electrochemical fuel cells the present invention includes distribution of such materials wherein there is:

1. a recyclable metal fluid fuel supply system comprising a hierarchy of:
   a) at least one central processing plant for recycling spent electrochemical reaction products of the metal fluid fuel into fresh metal for use in the metal fluid fuel of the present invention by;
   b) vehicle means for transport of the metal fluid to remote storage facilities or directly to metal fluid fuel reservoirs for direct use by consumers of the metal fluid fuel contained therein; and for collection of spent fuel from said remote storage sites and fuel reservoirs;
   c) optional storage facilities for local containment of the metal fluid fuel for distribution thereof to local reservoirs for consumers of said metal fluid fuel; and
   d) local reservoirs of consumers for direct use by consumers of the metal fluid fuel contained therein in one or more electrically powered utilization devices such as electrical appliances, electric automobiles and the like.

It is understood that the metal, such as zinc powder or particles, may be fluidized with a fluid carrier at any point prior to actual electrochemical use though transport and handling is significantly facilitated with an early fluidization.

As part of the hierarchy and as the hub therefore, is a plant or refinery or series of plants or refineries of appropriate size and location for collection and recycling of electrochemical reaction products to fresh fuel, where vehicle carriers are loaded with fresh fuel and where the vehicles supply spent fuel (i.e., defined as reaction products collected during fuel usage and which are recyclable to fresh fuel) for recycling.

The fuel used in the system of the present invention, undergoes a reversible chemical reaction product, during use, which is reversible to the original fuel and which reaction product(s) is (are) collected by each of said fluid fuel transport means, and includes combustion fuels where reaction products are retrievable and reversible to initial fuel.

A highly desirable fuel is a metal fluid or paste, such as of zinc particles in a fluid electrolyte carrier such as an aqueous potassium hydroxide solution, which efficiently provides electricity in an electrochemical couple. Details of the metal fluid or paste in a fuel use for generation of electricity in a fuel cell configuration, as well as reservoir structure and method of recycling and recharging is described in greater detail in co-pending application Ser. No. 09/570798 filed May 12, 2000, the disclosure of which is included in its entirety herein by reference thereto. Other metals suitable for use an electrochemical fuel include lithium, sodium, potassium (requiring some special handling and usually non-aqueous fluids), calcium, magnesium, silver, iron and other metals recognized as providing viably efficient electrochemical couples in an electrochemical cell.

In a highly preferred embodiment of the present invention at least one, and preferably all of the transport, storage (commercial and consumer) and reservoir means (including those contained within appliances or connected thereto) comprise a storage volume with separated chambers adapted to inversely change, relative to fuel being supplied and reaction product being collected and stored, as described in said application. As a result, a single volume during transport, storage, and use, provides the dual function of fuel supply and collection of reversible reaction product, with concomitant nearly halving of transport, storage and use volumes and costs.

In such embodiment the present invention comprises a recyclable fuel supply system comprising a hierarchy of:
  a) at least one central processing plant for recycling spent fuel products into fresh fuel;
  b) vehicle means for transport of fuel to remote storage facilities or directly to fuel reservoirs for direct use by consumers of fuel contained therein; and for collection of spent fuel from said remote storage sites and fuel reservoirs;
  c) optional storage facilities for local containment of fuel for distribution thereof to local reservoirs for consumers of said fuel;
  d) local reservoirs of consumers for direct use by consumers of fuel contained therein.

Each of the central processing plant, vehicle means, optional storage facilities and local reservoirs comprises a container connectable to a fuel take-up element and a spent fuel exhaust wherein the container comprises at least two chambers of inversely variable volume disposed within the container for respectively storing a quantity of fuel and receiving a quantity of exhaust.

The containers each comprise means for decreasing the volume of one of the chambers while concurrently increasing the volume of the other of the chambers concomitantly with increase in volume of fuel or spent fuel and decrease in volume of the other of the fuel or 5pent fuel.

Except for containers connected directly to utilization devices, the container bodies are utilized for efficient transfer of fuel and spent fuel, e.g., between transport vehicles and refinery plant and between transport vehicles and storage or reservoir sites.

Unlike any other current method of fuel supply, waste material, in the form of reaction products, is collected during delivery of fresh fuel, as opposed to waste material being discarded or vented to the atmosphere (or even separately collected), in an efficient, simultaneous supply and collection process.

At a central processing plant the waste material, such as zinc oxide, is separated from fluid electrolyte and is roasted or otherwise processed to reversibly provide fresh zinc fuel ion an efficient recycling process.

In addition, the present invention encompasses the use of an internet connection to conduct transactions between users and distributors to enhance efficiency of transactions including of ordering and supply and to initiate vehicle transport and supply to storage facilities or local use reservoirs. With such method, a user contacts a distributor to deliver fuel on a periodic set interval basis over a web home page and connection (alternatively sensors within a fuel storage tank provide a signal to a distributor to indicate need for replenishment of the fuel supply) and for collection and recycling of spent materials. Billing is based on physical supply amounts, with credits for returned spent fuel for recycling.

The method of the present invention comprises overall steps in effecting a substantially fully recyclable distribution, collection and recycling of fuel and particularly fluidized metal particles and their use in powering electrical appliances at a consumer level. The method comprises the steps of:
  a) initially transporting fuel from a supply and recycling plant by transport means to fuel storage facilities (alternatively the fuel is directly transported to the fuel supply reservoir);
  b) distributing fuel from the fuel storage facility to a fuel supply reservoir proximate to consumers of said fuel;
  c) periodically tapping the fuel supply in said reservoir by authorized tappers as required to obtain sufficient fuel to power an electrical appliance, e.g., portable electrical appliances including home appliances, electric bikes, scooters, wheelchairs, toys, portable computers or an electric automobile, as well as supplying fuel for the home itself such as for heating, air conditioning, cooking, providing hot water, dish washers, clothes washers, refrigerators, entertainment centers and dryers etc;
    wherein transport, distribution and use of the fuel is simultaneously accompanied by retrieval of fuel waste material or reaction products and wherein transport of fuel from the supply and recycling plant to the transport means is accompanied by retrieval of fuel waste material by the plant for the recycling thereof to fresh fuel.

It is understood that for appliances and household functions requiring an AC rather than a DC power supply, fuel for the generation of electricity may be used in conjunction with appropriate transformer (and rectifier if necessary) devices or with the use of a local generator to supply the requisite current requirements.

The above and other objects, features and advantages of the present invention will become more evident from the following discussion and drawings in which:

SHORT DESCRIPTION OF THE DRAWINGS

Figure 1B:
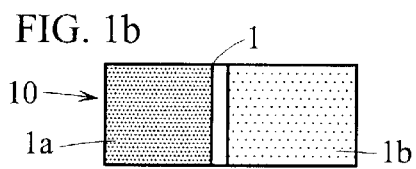
Figure 1C:
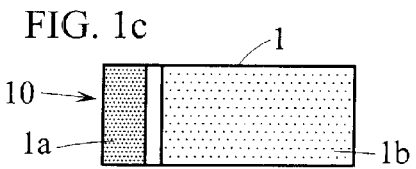
Figure 4B:
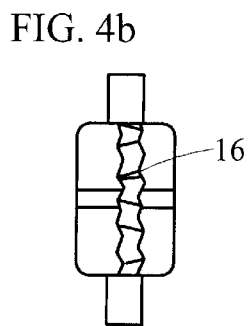
Figure 4A:
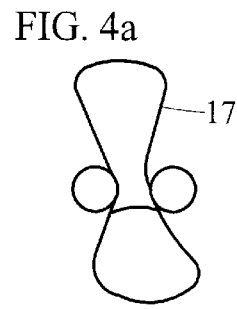
Figure 3C:
Figure 2D:
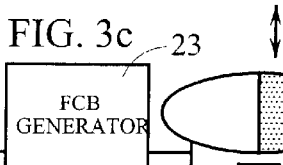
Figure 3A:
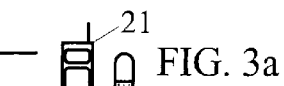
Figure 3B:
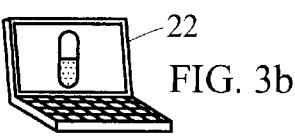

FIGS. 1a–c depict an overall schematic of the supply/take-up container or reservoir of the present invention;

FIGS. 2a–d depict the supply/take-up container of the present invention as embodied in storage and supply elements in a central supply and conversion station, transport delivery truck and cargo ship, and a residential fuel tank respectively;

FIGS. 3a–d schematically depict localized fuel container structural use in devices of a cellular phone, laptop computer, automobile and residential electrical generator respectively; and FIGS. 4a and 4b depict fuel transport mechanisms in the devices of FIGS. 3a–c.

DETAILED DESCRIPTION OF THE INVENTION

Since a preferred fuel of a slurry of metal particles such as zinc is one involved in electrochemical electricity generation rather than a combustion process, volatility of the fuel is very low and transport and handling is totally safe. This is in contrast to fuel delivery of materials such as petrochemicals and particularly highly volatile gasoline.

Electrical production with a metal fuel which reversibly forms a metal oxide reaction product, particularly in a stable flowable paste form, as described in said co-pending application, is a particularly suitable fuel for the present system for use in large scale fuel cell applications particularly in zinc/air systems with the reaction production of readily recycled zinc oxide.

The storage means such as the reservoirs, exemplified by home based consumer reservoirs, for the delivered fuel are preferably provided with coupling inlet/outlet devices for simultaneous supply of fuel and for retrieval of reaction product waste products during delivery/retrieval. As configured, a supply pumping in of fresh fuel serves to also pump out spent fuel (reaction products) into the inversely changing volumes for supply and retrieval. The inlet/outlet couplers are preferably of quick attachment design such as with a bayonet or screw on connection and are desirable integrated to require only a single attachment to connect both pair of inlets and outlets. A preferred design is a concentric arrangement relative to each other or alternatively with proximate lateral positioning to facilitate connections and use. The home based storage reservoirs include means for tapping of fuel for local use such as for portable electronics products in a manner akin to changing batteries, but wherein the electronic products are all provided with inversely proportional supply and waste retrieval reservoirs for individual collection directly from the devices. During the "refueling" of such devices at the home based reservoir, spent material is effectively pumped from the device or associated reservoir to the storage reservoir for collection according to the hierarchy until returned to the hub recycling center for regeneration of fuel.

Storage reservoirs include those at specialized locations or even local consumer locations for periodic fuel supply to automobiles, i.e. refueling stations. Refueling with these applications is simultaneously effected with the removal of prior stored waste products directly to the reservoir. Coupling elements simultaneously connect the fuel supply and fuel waste collection to corresponding elements of the automobile. Similarly, appropriately equipped devices, can also be provided with fresh fuel at the refueling stations.

DETAILED DESCRIPTION OF THE DRAWINGS AND THE PREFERRED EMBODIMENTS

With specific reference to the drawings, FIGS. 1a–c, schematically depict the basic storage unit 10 of the present invention which comprises an overall enclosure 1, divided into at least two chambers 1a and 1b for containment of fuel and spent fuel (i.e., fuel use reaction products) of a recyclable type such as zinc paste for fuel cells. The chambers are inversely proportional in size such that supplying of fuel, with concomitant reduction in fuel volume, with increase of reaction product takeup or collection volume are accompanied by accommodating changes in volume of the chambers, i.e., the chambers 1a and 1b are inversely proportional in volume, whereby a single overall minimal volume is adapted to efficiently accommodate both fuel and waste products (recyclable reaction products). This is sequentially shown in FIGS. 1b and 1c. Storage unit 10 can be of any size and configuration adapted to the particular use and requirements, but all with the feature of inversely variable volumes for containing fuel and waste material takeup.

Figure 2A:
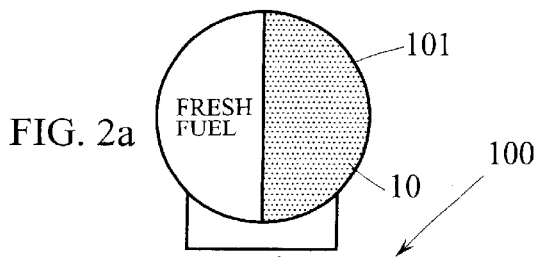
Figure 2B:
Figure 2C:
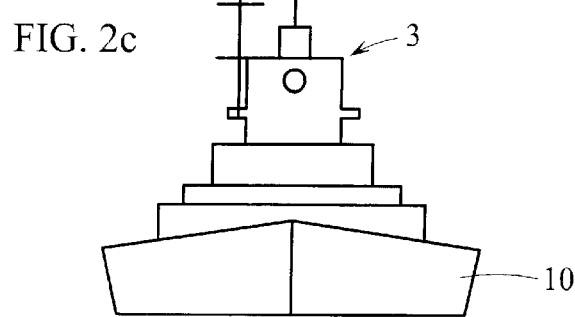

The storage unit 10 of FIGS. 1a–c, and the operation thereof, is extended to the hierarchical storage and supply system 100 depicted in FIGS. 2a–d, wherein processing or recycling plant 101, at the head of the hierarchy, comprises one or more units 10 wherein, as waste material is removed from chamber 1b and recycled into fuel, chamber 1b becomes smaller and chamber 1a becomes larger to accommodate newly produced fresh fuel. As shown in FIGS. 2b and 2c, transport vehicles 2 and 3 (delivery truck and cargo ship respectively) are each provided with appropriately sized storage units 10. At the recycling plant 101, trucks 2, ships 3 (with appropriate harbor facilities) and the like are filled with fuel for delivery or shipment and respective chambers 1a are maximized in volume and chambers 1b are minimized in volume.

Figure 3D:
Figure 3D:
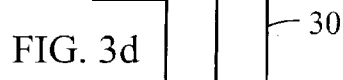

In FIGS. 3a–d, consumer reservoir 20 is a fuel tank for household uses of a cellular phone 21, laptop computer 22 (and residential generator 23) which have variations of storage unit 10 are recyclably filled and emptied at reservoir 20 which is periodically filled/emptied by supply trucks 2. In FIG. 3d automobile 31 is fueled (filled/emptied) at an independent fueling station 30 akin to common gasoline service stations.

While pump elements 15 are effectively utilized with respect to the various large scale reservoir, storage and transport means, it is not viable with respect to smaller consumer products as shown in FIGS. 3a–c. Accordingly in such devices, fuel is moved by means of flexible walls of internal reservoirs for the devices, shown in FIG. 4a, which can be manually squeezed to move fuel into the devices for use and waste products into the take up chamber of the reservoir. Alternatively, as shown in FIG. 4b, a spiral screw 16 serves to move the fuel and waste products.

It is understood that the above description and drawings are only exemplary of the present invention and that changes in structures, arrangements, materials and the like are possible without departing from the scope of the present invention as defined in the following claims.

What is claimed:

1. A recyclable fuel supply system comprising a hierarchy of:
    a) at least one central processing plant for recycling spent fuel products into fresh fuel;
    b) vehicle means for transport of fuel to remote storage facilities or directly to fuel reservoirs for direct use by consumers of fuel contained therein; and for collection of spent fuel from said remote storage sites and fuel reservoirs;
    c) optional storage facilities for local containment of fuel for distribution thereof to local reservoirs for consumers of said fuel;

d) local reservoirs of consumers for direct use by consumers of fuel contained therein in one or more utilization devices, wherein each of said central processing plant, vehicle means, optional storage facilities, local reservoirs and optionally utilization devices, comprises a container connectable to a fuel take-up element and a spent fuel exhaust wherein said container comprises at least two chambers of inversely variable volume disposed within said container for respectively storing a quantity of fuel and receiving a quantity of exhaust; and means for decreasing the volume of one of said chambers while concurrently increasing the volume of the other of said chambers concomitantly with increase in volume of fuel or spent fuel and decrease in volume of the other of said fuel a or spent fuel.

2. The system of claim 1, wherein the fuel comprises an electrochemical fuel and wherein said system further comprises electrically powered devices adapted for use with fuel from said local reservoirs and wherein said devices each comprises a container connectable to a fuel take-up element and a spent fuel exhaust wherein said container comprises at least two chambers of inversely variable volume disposed within said container for respectively storing a quantity of fuel and receiving a quantity of exhaust; and means for decreasing the volume of one of said chambers while concurrently increasing the volume of the other of said chambers concomitantly with increase in volume of fuel or spent fuel and decrease in volume of the other of said fuel or spent fuel.

3. The system of claim 1, wherein said local reservoir comprises a refueling station for any or all of fueling of automobiles and devices and wherein each of said automobiles and devices comprises a container connectable to a fuel take-up element and a spent fuel exhaust wherein said container comprises at least two chambers of inversely variable volume disposed within said container for respectively storing a quantity of fuel and receiving a quantity of exhaust; and means for decreasing the volume of one of said chambers while concurrently increasing the volume of the other of said chambers concomitantly with increase in volume of fuel or spent fuel and decrease in volume of the other of said fuel or spent fuel.

4. The system of claim 2, wherein said fuel comprises a liquid or paste comprised of zinc particles.

5. The system of claim 1, wherein containers of the central processing plant and containers of the vehicle means; containers of the vehicle means and the storage facilities or reservoirs; optional containers of the storage facilities or reservoirs and optional containers of the utilitarian devices and optional containers of the utilization devices; comprise coupling means for coupling respective fuel containing and spent fuel containing chamber pairs for the transfer of fuel and spent fuel between said chamber pairs.

6. The system of claim 5, wherein said coupling means comprises an integrated coupling between respective chamber pairs.

7. The system of claim 1, wherein the vehicle means comprises any of trucks, trains and ships.

8. The system of claim 5, wherein said transfer of fuel and spent fuel is effected by pump means linked to said coupling system.

9. The system of claim 1, wherein containers of said utilization devices comprise manually controlled means for effecting transfer of fuel from said container to the device for utilization thereof.

10. The system of claim 9, wherein walls of the container of the utilization device are flexible and capable of being compressed to effect said transfer of fuel to the device.

11. The system of claim 1, wherein said transport is initiated by a request for transport of said fuel to any of a storage distribution facility or local utilization reservoir conveyed on the internet.

12. The system of claim 1, wherein said transport is initiated by a request for transport of said fuel to any of a storage distribution facility or local utilization reservoir conveyed by sensors adapted to sense a depletion of fuel to a pre-specified level.

13. The system of claim 2, wherein the containers of local use reservoirs comprise separate tapping means for removal of fuel therein for use in a utilization device.

a recyclable metal fluid fuel supply system comprising a hierarchy of:

a) at least one central processing plant for recycling spent electrochemical reaction products of the metal fluid fuel into fresh metal for use in the metal fluid fuel of the present invention by;

b) vehicle means for transport of the metal fluid to remote storage facilities or directly to metal fluid fuel reservoirs for direct use by consumers of the metal fluid fuel contained therein; and for collection of spent fuel from said remote storage sites and fuel reservoirs;

c) optional storage facilities for local containment of the metal fluid fuel for distribution thereof to local reservoirs for consumers of said metal fluid fuel; and d) local reservoirs of consumers for direct use by consumers of the metal fluid fuel contained therein in one or more electrically powered utilization devices such as electrical appliances, electric automobiles and the like.

14. A recyclable metal fluid fuel supply system comprising a hierarchy of:

a) at least one central processing plant for recycling spent electrochemical reaction products of the metal fluid fuel into fresh metal for use in the metal fluid fuel of the present invention by;

b) vehicle means for transport of the metal fluid to remote storage facilities or directly to metal fluid fuel reservoirs for direct use by consumers of the metal fluid fuel contained therein; and for collection of spent fuel from said remote storage sites and fuel reservoirs;

c) optional storage facilities for local containment of the metal fluid fuel for distribution thereof to local reservoirs for consumers of said metal fluid fuel; and d) local reservoirs of consumers for direct use by consumers of the metal fluid fuel contained therein in one or more electrically powered appliances.

15. The system of claim 14, wherein said system comprises means for collecting spent fuel by said transport means and at said storage facilities, local reservoirs and said appliances for recycling thereof at said central processing plant.

16. A method for effecting a substantially fully recyclable distribution, collection and recycling of fuel comprising fluidized metal particles, and their use in powering electrical appliances at a consumer level, wherein the method comprises the steps of:

(a) initially transporting fuel from a supply and recycling plant by transport means to fuel storage facilities;

(b) distributing fuel from the fuel storage facility to a fuel supply reservoir proximate to consumers of said fuel;

(c) periodically tapping the fuel supply in said reservoir by authorized tappers as required to obtain sufficient fuel to power an electrical appliance or an automobile; wherein transport, distribution and use of the fuel is simultaneously accompanied by retrieval of fuel waste material or reaction products and wherein transport of fuel from the supply and recycling plant to the transport means is accompanied by retrieval of fuel waste material by the plant for the recycling thereof to fresh fuel.

17. The method of claim 16, wherein said electrical appliance is selected from portable electrical appliances, home appliances, electric bikes, scooters, wheelchairs, toys, portable computers and electric automobiles.

18. The method of claim 17, wherein said fuel supply reservoir further supplies fuel for a home of said consumer to provide power for at least one of heating, air conditioning, cooking, providing hot water, powering dish washers, clothes washers, refrigerators, entertainment centers and dryers.

\* \* \* \* \*